March 4, 1969 W. T. SUCHOWOLEC 3,430,647
SAFETY VALVE FOR PROPANE CYLINDERS
Filed June 10, 1966 Sheet 2 of 2
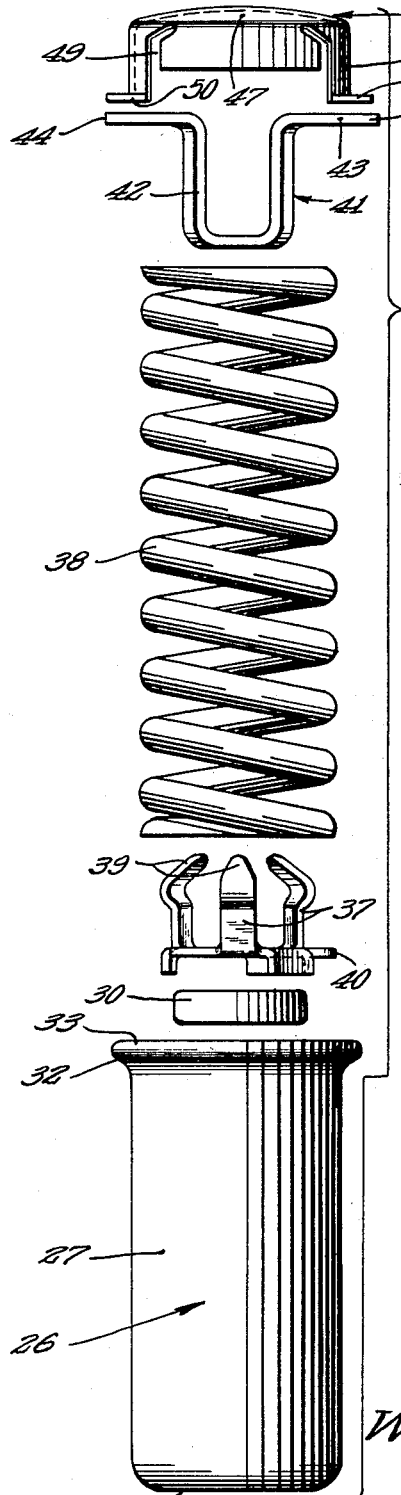
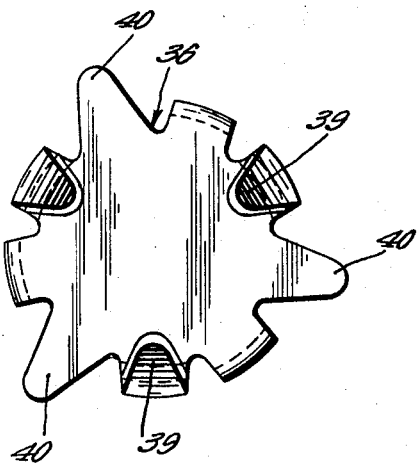
INVENTOR.
Walter T. Suchowolec
BY ATTORNEYS United States Patent Office 3,430,647
Patented Mar. 4, 1969

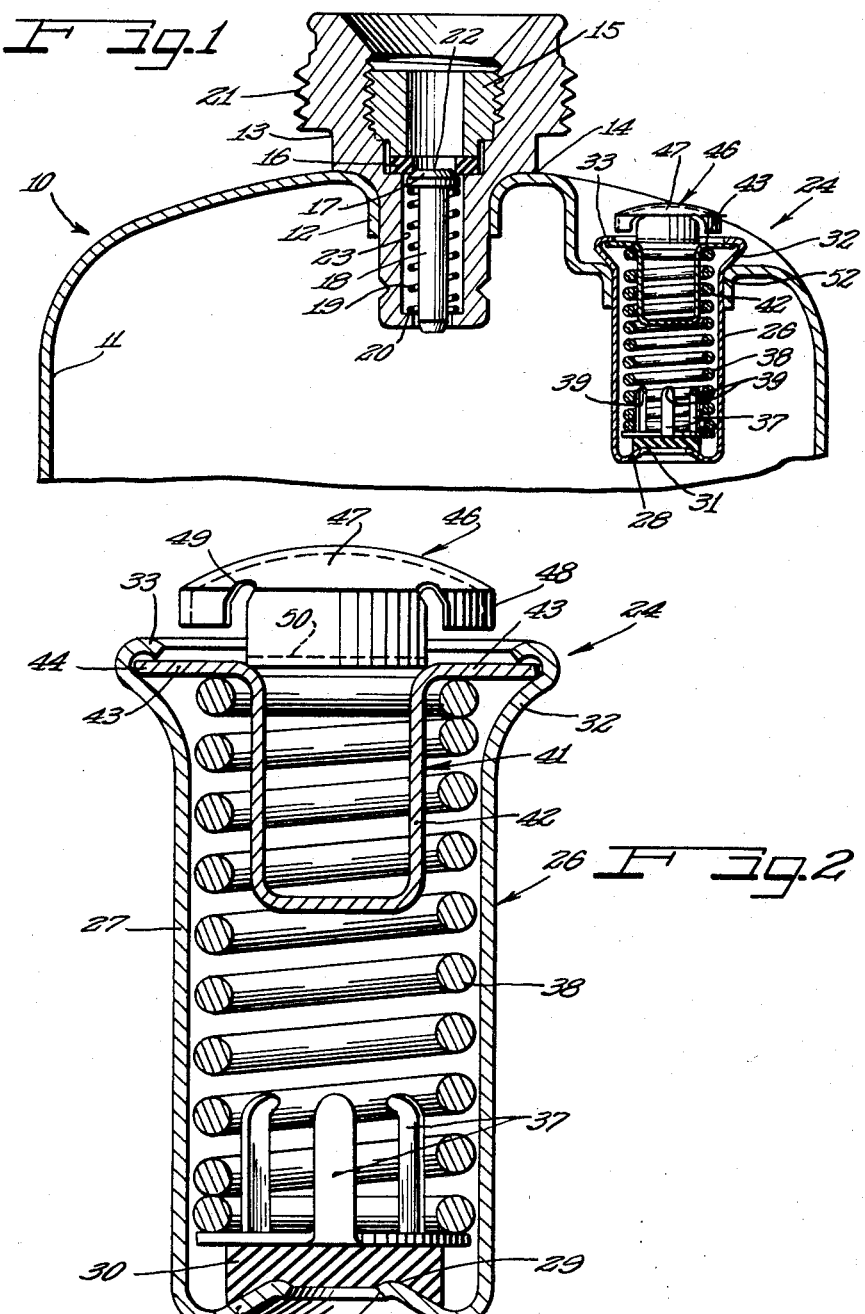

3,430,647
SAFETY VALVE FOR PROPANE CYLINDERS
Walter T. Suchowolec, De Kalb, Ill., assignor to Turner Corporation, Sycamore, Ill., a corporation of Illinois
Filed June 10, 1966, Ser. No. 560,980
U.S. Cl. 137—377
Int. Cl. F16k 17/08, 15/06, 27/00
7 Claims This invention relates generally to valves and more specifically to an improved safety valve for propane cylinders wherein the valve construction is characterized by a combination of sheet metal parts sized and proportioned to have a depth to diameter ratio permitting the use of a valve body made as a stamping and a wide diameter spring which is safeguarded against overstressing and wherein the body has an embossed lip forming an integral valve seat surrounding a large opening affording rapid expulsion of gases and permitting the value to operate as a true spring-biased relief valve fully capable of reseating and resealing.

It is an object of the present invention to provide an improved pressure relief valve construction for propane tanks which overcomes the deficiencies of the prior art.

Another object of the present invention is to provide an improved pressure relief valve in an integral prepackaged construction so that the valve is capable of being pretested and preassembled as a unit.

Yet another object of the present invention is to provide a relief valve assembly wherein the body has a depth to diameter ratio permitting the body to be made as a stamping.

A further object of the present invention is to provide a relief valve with a large opening than has been heretofore provided in relief valves for propane tanks.

Yet another object of the present invention is to provide a relief valve for a propane tank wherein the discharged gas is diffused perpendicularly to the axis of the tank or container, thereby avoiding harmful thrust and any undesirable missile or projectile effect.

A further object of the present invention is to provide a relief valve construction for a propane tank wherein the relief valve operates as a true spring-loaded relief valve capable of cycling and thereby avoiding bulging of containers or propane tanks due to pressure increase or gas expansion.

Many other features, advantages and additional objects of the present invention will become manifest to those versed in the art upon making reference to the detailed description which follows and the accompanying sheets of drawings in which a preferred structural embodiment of the present invention is shown by way of illustrative example.

On the drawings

FIGURE 1 is a cross-sectional view of a propane tank incorporating a pressure relief valve in accordance with the principles of the present invention.

FIGURE 2 is an enlarged cross-sectional view showing additional details of the pressure relief valve construction.

FIGURE 3 is an exploded view showing the individual components of the pressure relief valve construction.

FIGURE 4 is a plan view of the seal retainer.

As shown on the drawings

Although the pressure relief valve of the present invention is of general utility, a particularly useful application is found in applying the same to a propane tank or container of the type illustrated in FIGURE 1 and shown generally at 10. Thus, the tank or bottle has a shell 11 formed with an inwardly turned embossment 12 in which is fixedly mounted a center inlet fitting 13 brazed as at 14 in order to provide a gas-tight seal.

The center inlet fitting 13 has a seal ring 16 held in place by a retainer 15 which may either be screw-threaded or otherwise press-fit to hold the seal ring 16 in position for being engaged by a head 17 of a value member 18. The head 17 also bottoms one end of a coil spring 19, the other end of which is bottomed against an inwardly directed flange 20. The center inlet 13 is externally threaded as at 21, thereby to facilitate engagement with a propane appliance and it will be understood by those versed in the art that the usual pusher pin will be provided on the appliance to engage against the top surface 22 of the head 17, thereby moving the valve 18 against the bias of the spirng 19 and opening a flow passage 23 so that the gaseous contents of the tank or bottle 10 will be delivered to a point of utilization.

Propane tanks or containers, as shown at 10, are widely sold in interstate commerce and it is required that such containers comply with interstate shipping regulations and also with the safety requirements prescribed by such organizations as Underwrites' Laboratories. Thus, it is an important and significant requirement that the containers be provided with adequate pressure relief devices to prevent dangerous explosions and gas leakage.

In pressure relief devices heretofore provided, means have been incorporated which are either frangible or otherwise require a physical change or failure of the components incorporated therein. Accordingly, with such prior art devices, once the frangible component ruptures, it is incapable of again resealing the container, whereupon the entire contents of the tank will be dissipated to the surrounding atmosphere. Under such circumstances, it is possible that the relief device will actually create a greater hazard through the leakage of the gaseous contents of the container than would exist because of the expansion of the gas in the container.

Furthermore, since such prior art devices do not always respond to small incremental changes in pressure, sometimes a gradual build-up of pressure will result in a bulging of the walls of the container, thereby increasing the risk of container failure.

Again, with prior art devices, the pressure relief devices sometimes discharge in an axial direction with respect to the tank and consequently a sufficient thrust will be developed so that the tank itself becomes a projectile or missile and the rapid expulsion of gas through the pressure relief device will create an extreme hazard under those circumstances.

In accordance with the principles of the present invention, all of such deficiencies are overcome by a novel construction wherein the pressure relief valve is shown generally at 24. More specifically, the pressure relief valve 24 includes a pressure relief body 26 having a depth to diameter ratio of such a size as to permit the body to be made as a stamping. In other words, the body 26 is made of thin sheet metal and is stamped or drawn to provide a generally cylindrical member having side walls 27 and a radially inwardly extending end wall 28. The end wall 28 is embossed as at 29 thereby to form a lip constituting a valve seat for a seal member 30. The innermost end of the lip circumscribes an opening 31 and the lip is preferably coined by a restriking operation to provide a smooth seating surface for the seal member 30.

At the opposite end, the pressure relief body 26 flares somewhat outwardly, as shown at 32, and terminates in an inwardly turned retainer lip 33 forming a recess in which is received the locking flanges of associated parts.

The sealing member 30 is made of a suitable sealing material such as a synthetic rubber which is impervious to the effects of propane or other contents of the container 10 and it will be noted that the sealing member 30 is generally of disk-shaped configuration having an outer diameter larger than the diameter of the opening 31, thereby to overlie the valve seat 29 formed at the edges of the opening 31.

The sealing member 30 is fastened in firm assembly to a seal retainer member shown generally at 36. The seal retainer member 36 has a flat body portion with a plurality of circumferentially spaced projecting fingers or lugs 37 extending axially and thereby together with one another forming a pilot portion for entering the convolutions of a coil spring 38. The extreme ends of the fingers 37 are offset radially inwardly as at 39 to facilitate assembly of the retainer 36 and the spring 38. Thus, the retainer 36 provides a bottoming surface engaging one end of the coil spring 38. Further, extending radially outwardly from the body of the retainer 36 are a plurality of circumferentially spaced lugs or fingers 40 which are spaced closely adjacent the inside surface of the side walls 27 of the body 26. Such fingers or lugs 40 operate to stabilize the operation of the valve and will slidingly engage the inner wall surface, thereby to center the sealing member 30 and permit a good reseating and resealing action whenever the pressure relief valve has been temporarily opened.

After the sealing member 30, the retaining member 36 and the coil spring 38 has been assembled in the body 26, a spring retainer member, shown generally at 41, is used to lock the components in assembly with one another.

It will be noted that the retainer member 41 is generally U-shaped in configuration, thereby to provide a pilot portion 42 which enters the spring 38 inwardly of its convolutions. A radially outwardly extending portion 43 forms a bottoming surface for engaging the other end of the coil spring 38 and at the extremities of the retainer member 41, there is provided an outwardly extending lip 44 which engages the lip 33 of the body 26, thereby locking the components of the valve in firm assembly with one another.

The retainer 41 is readily assembled in a snap-in relationship with the body 26, thereby facilitating quick and ready assembly without the necessity of employing screw threads and thereby insuring uniformity in the operating pressure characteristics of the valve construction since the interrelationship of the parts can be readily predetermined so that a release will be accomplished at container pressures of approximately 375 to 425 pounds per square inch. Once snap-in assembly is accomplished, however, the valve construction will not be readily disassembled without virtually destroying the entire valve assembly.

After preassembly of the components already described, a cap member shown at 46 is fixed in place. It will be noted that the cap 46 has a dome-shaped canopy 47 and depending side walls 48 which are split as at 49 and shaped by crimping as at 50 so that the cap will snap tightly into the pressure relief body 26 with the crimped portions 50 engaged by the lip 33.

The split portions of the side walls, as at 49, leave a plurality of circumferentially spaced discharge openings which are directed perpendicularly to the axis of the valve and hence to the axis of the container 10, thereby to diffuse any gas discharged by the pressure relief valve assembly 24 in a radial direction. In this regard, the domed canopy portion 47 operates as a baffle to further dissipate and diffuse the flow of exiting gas.

The entire valve assembly is inserted into an embossed opening 52 formed in the tank or container 10 and the valve assembly may be brazed as at 53 to insure a good seal.

It will be readily recognized that because of the advantageous depth to diameter ratio, the opening 31 is particularly large when compared to prior art structures, thereby permitting a more rapid expulsion of gases in the event the pressure relief device is required to effect such expulsion.

Moreover, it will be noted that the spring 38 is of a much larger diameter relative to the springs generally employed in pressure relief valves, thereby permitting the selection and use of a coil spring which will not be subject to overstressing. Further, the valve assembly provided affords a true spring loaded relief valve action since the valve does not rely on physical change or failure of components to operate. This insures that the valve will truly cycle when an excess pressure is detected but will effectively reseat and reseal once proper pressure within the container is again attained.

All of the parts such as the body, the retainer members and the cap can be fabricated from simple sheet metal forms and the seal member 30 is also readily available rubber-like material so that a particularly useful and reliable valve construction is provided at a minimum of manufacturing expense.

Although various minor modifications might be suggested by those versed in the art, it should be understood that I wish to embody within the scope of the patent warranted hereon all such modifications as reasonably and properly come within the scope of my contribution to the art.

I claim as my invention:

1. A valve comprising
    a body member made of sheet metal shaped to have a cylindrical outer wall and
        a radially inwardly extending wall at one end apertured and embossed to form an integral valve seat,
        and a radially outwardly extending retainer portion at the opposite end of said body member,
    a disk-shaped sealing member overlying said valve seat inside of said body member,
    a seal retainer member made of sheet metal and to which said sealing member is connected on one side and against which a coil spring may be bottomed on its opposite side,
    a coil spring having one end bottomed on said seal retainer member inside of said body member,
    a spring retainer clip in snap-in assembly with said retainer portion of said body member and having a portion bottoming the other end of said coil spring,
    and a cap member having a dome-shaped canopy overlying said body member and including side walls engaging said retainer portion in firm assembly,
        said cap member side walls having passages opening sideways to diffuse discharged gases without axial thrust.

2. In a pressure relief valve assembly,
    a body member having an axial valve controlled passageway through which gases may be directed,
    and a cap member in the outer end of said body member having a dome-shaped canopy overlying said passage and including side walls engaging said body member in firm assembly therewith,
        said cap member side walls having passages opening sideways to diffuse discharged gases out of said passageway without imparting axial thrust to said pressure relief valve.

3. A valve device for a propane container comprising
    a body member made of sheet metal shaped to have a cylindrical outer wall and a radially inwardly extending wall at one end apertured and embossed to form an integral valve seat,
    a disk-shaped sealing member overlying said valve seat inside of said body member,
    a coil spring having one end bottomed against said sealing member,
    a spring retainer clip bottoming the other end of said coil spring and having portions engaging said body member in snap-in assembly,
        said body member having a depth to diameter ratio providing a large gas flow opening and permitting the use of a wide diameter coil spring.

4. A valve as defined in claim 3 and further characterized by a cap member in said body member overlying said spring retainer,
   said cap member having side openings through which discharged gas is diffused.

5. A pressure relief valve for a propane container comprising
   a body member having cylindrical outer walls and a radially inwardly extending end wall,
      said end wall being apertured and embossed to form an integral valve seat,
   a sealing member subassembly comprising a seal retainer and a sealing member overlying said valve seat inside of said body member,
   a coil spring inside of said body member having one end bottomed against said seal retainer,
   a spring retainer having snap-in fastening means engaging said body member in snap-in assembly,
   thereby to confine said spring and said seal subassembly in firm assembly with said body member,
      said body member, the seal retainer and said spring retainer being made of sheet metal and said body member having a depth to diameter ratio such that said body member may be fabricated as a stamping.

6. A pressure relief valve as defined in claim 5 wherein said seal retainer is characterized by having formed thereon a plurality of circumferentially spaced axially extending fingers forming a pilot portion for entering inside the convolutions of said coil spring.

7. A pressure relief valve as defined in claim 5 said seal retainer being further characterized by having a plurality of circumferentially spaced radially outwardly extending lugs for slidably engaging the adjoining inside surface of said body member, thereby to stabilize and center the seating action of said sealing subassembly on said valve seat.

References Cited

UNITED STATES PATENTS

| | | | |
|---|---|---|---|
| 512,369 | 1/1894 | Garis | 137—543.17 |
| 2,028,755 | 1/1936 | Crecca | 137—377 XR |
| 3,228,419 | 1/1966 | Smith | 137—540 |

HAROLD W. WEAKLEY, *Primary Examiner.*

U.S. Cl. X.R.

29—157.1, 511; 137—543.17; 251—367